United States Patent
Mazgaj et al.

(10) Patent No.: US 6,807,512 B2
(45) Date of Patent: Oct. 19, 2004

(54) NODE IDENTIFICATION BY DISPLACEMENT

(75) Inventors: Mark Robert Mazgaj, Lakewood, NY (US); Brian Lewis Spunaugle, Jamestown, NY (US)

(73) Assignee: Acu-Rite, Inc., Jamestown, NY (US)

( * ) Notice: Subject to any disclaimer, the term of this patent is extended or adjusted under 35 U.S.C. 154(b) by 0 days.

(21) Appl. No.: 10/313,064

(22) Filed: Dec. 6, 2002

(65) Prior Publication Data

US 2004/0111234 A1 Jun. 10, 2004

(51) Int. Cl.$^7$ .......................... G01B 11/02; G01B 11/14; G01B 13/02
(52) U.S. Cl. ...................................................... 702/163
(58) Field of Search ................................ 702/92–95, 97, 702/150–153, 155, 158, 163; 250/231.14, 231.18

(56) References Cited

U.S. PATENT DOCUMENTS

| | | | |
|---|---|---|---|
| 4,656,463 A | 4/1987 | Anders et al. | 340/573.4 |
| 4,827,395 A | 5/1989 | Anders et al. | 700/9 |
| 5,499,374 A | 3/1996 | Di Giulio et al. | 710/240 |
| 6,013,108 A | 1/2000 | Karolys et al. | 702/189 |
| 6,115,654 A | 9/2000 | Eid et al. | 701/34 |
| 6,124,588 A * | 9/2000 | Hagl et al. | 250/231.14 |
| 6,421,628 B1 | 7/2002 | Thorsander et al. | 702/150 |
| 2002/0033682 A1 * | 3/2002 | Ikegami et al. | 318/254 |
| 2002/0110155 A1 * | 8/2002 | Pearce et al. | 370/519 |
| 2003/0193306 A1 * | 10/2003 | Griffitts | 318/459 |

FOREIGN PATENT DOCUMENTS

| | | |
|---|---|---|
| EP | 0 866 316 A1 | 9/1998 |
| EP | 0 950 875 A1 | 10/1999 |
| EP | 1 037 126 A2 | 9/2000 |
| EP | 1 235 050 A2 | 8/2002 |

OTHER PUBLICATIONS

Hengstler GmbH product data sheet entitled, "Absolute Shaft Encoders RA 58–P/RA 59–P, CAN, " published by Hengstler GmbH of Aldingen, Germany, Feb. 25, 1999, pp. 1–4.

Muj et al., "Absolute–Encoders CANopen Profile—Technical Information," published by TR–Electronic GmbH of Trossingen, German, Feb. 8, 1999, pp. 1–31.

* cited by examiner

*Primary Examiner*—Michael Nghiem
(74) *Attorney, Agent, or Firm*—Brinks Hofer Gilson & Lione

(57) ABSTRACT

A method of identifying a node of an arrangement that includes a plurality of movable parts, the method including moving only one of a plurality of movable parts of an arrangement, detecting the moving of the one of the plurality of movable parts and distinguishing a node associated with the one of the plurality of movable parts based on the detecting.

10 Claims, 3 Drawing Sheets

NODE IDENTIFICATION BY DISPLACEMENT

BACKGROUND OF THE INVENTION

1. Field of Invention

The present invention relates to a method of identifying a node of a network system for devices with movable parts.

2. Discussion of Related Art

It is known to manufacture devices, such as machine tools, that have one or more axes of movement. It is also known to construct an industrial bus network system for such a device where a node is associated with each axis of movement, such as described in U.S. Pat. No. 6,421,628, the entire contents of which are incorporated herein by reference. Each such node needs to be identifiable. Identifying a node allows that node to obtain focused information. In known industrial bus networks such identification of the nodes normally occurs with dip switches or the identification value is hard coded in the software. Each node on the network needs to be set up with a different value.

One disadvantage of known industrial bus network systems of machine tools is that the electronic packaging is such the end user of the machine tool does not have access to the electronics and so is unable to adjust the manual setting components, such as switches and jumpers.

A second disadvantage of known industrial bus network systems of machine tools is that they often are inflexible in their identification of a node when they use hardware dipswitches.

Accordingly, it is an object of the present invention is to improve adjusting of settings of industrial bus network systems.

Another object of the present invention is to improve the flexibility in the identification of a node of industrial bus network systems.

Other objects of the present invention will become apparent from the following description of the present invention and embodiments thereof.

BRIEF SUMMARY OF THE INVENTION

One aspect of the present invention regards an arrangement including a plurality of movable parts, wherein each movable part is connected to a corresponding actuator and a measuring device that determines a position of one of the actuators. A master unit coupled to the actuators and to the measuring device, wherein the master unit receives measurement signals from the measuring device and sends control signals to the actuators so as to control movement of the plurality of movable parts, wherein the master unit distinguishes a node associated with the one of the actuators upon detecting movement of the movable part via the measurement signals.

A second aspect of the present invention regards a method of identifying a node of an arrangement that includes a plurality of movable parts, the method including moving only one of a plurality of movable parts of a system, detecting the moving of the one of the plurality of movable parts and distinguishing a node associated with the one of the plurality of movable parts based on the detecting.

Each aspect of the present invention provides the advantage of improving the adjusting of settings of industrial bus network systems.

Each aspect of the present invention provides the advantage of improving the flexibility in the identification of a node of industrial bus network systems.

Additional embodiments and advantages of the present invention will become apparent from the following description and the appended claims when considered with the accompanying drawings.

DETAILED DESCRIPTION OF THE INVENTION

Figure 1:
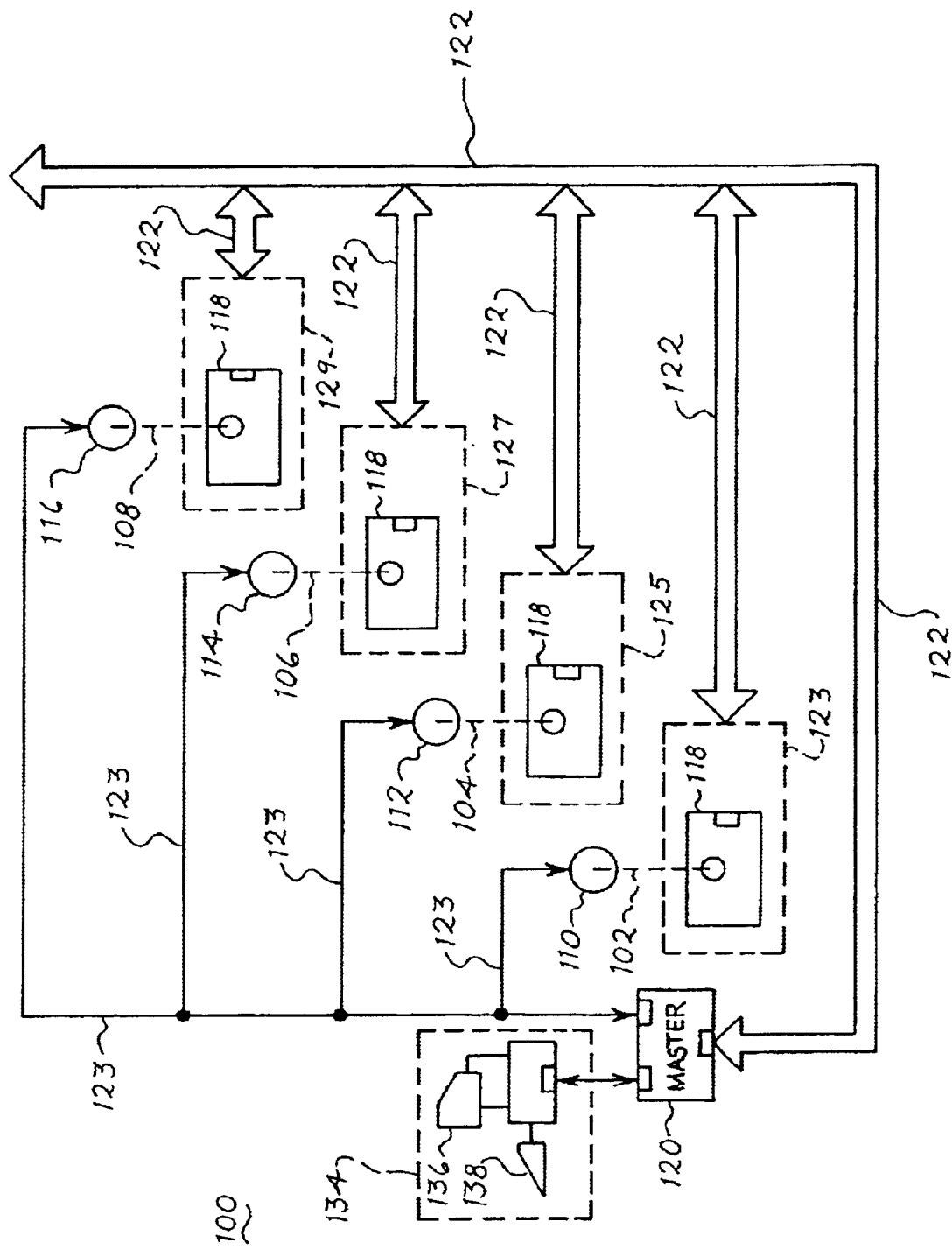
FIG. 1 schematically shows an embodiment of an arrangement of moving parts that employs an identification method in accordance with the present invention.

FIG. 1 schematically shows an arrangement 100 having movable parts 102, 104, 106, 108 and a system for controlling the movement of these movable parts. The arrangement includes a plurality of controllable actuators 110, 112, 114 and 116 for causing the movement of the movable parts. The actuators may be motors and the movable parts may be rotatable about axes, according to an embodiment of the invention.

The movable parts 102, 104, 106, 108 co-operate with measuring devices, i.e. devices for generating a signal indicative of a position or movement, such as optoelectrical positioning measuring devices 118 that include an encoding structure that has an optically readable pattern. The encoding pattern is read by one or more detectors which each deliver an electric signal in relation to the amount of light that is received in the detector, so that movement of the encoding pattern in relation to the detector will be indicated by changes in the electric signal. The encoding pattern includes a periodic pattern, such as a plurality of light and dark fields of mutually the same size, for instance. When the encoding pattern is turned or rotated in the case of a rotary encoder or translated in a measuring direction in the case of a linear encoder, the change between dark and light fields can be detected and a change in angle or linear position thus determined. Some position measurement devices provide a position signal comprising a plurality of pulse signals, where the state of the pulse signals at an instant of time defines the absolute position of the encoding disc in relation to the detector. These position measuring devices are also referred to as absolute encoders.

A master unit 120 is coupled to the measuring devices 118 for receiving the measurement signals. The master unit 120 is also coupled to the actuators 110, 112, 114 and 116 via lines 123 for providing control signals so as to control the movement of the movable parts 102, 104, 106 and 108 in dependence on the measurement signals.

Figure 2:
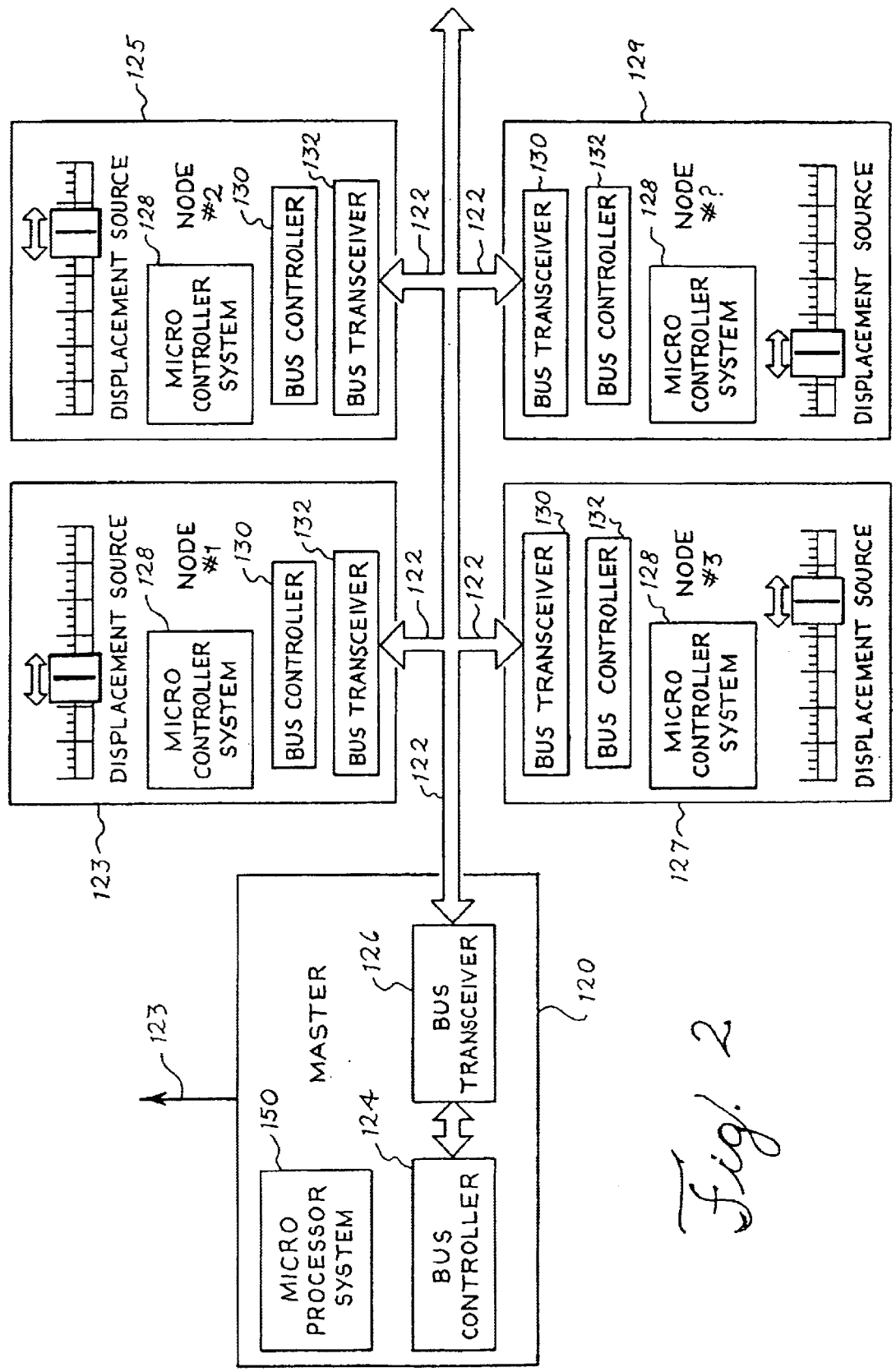
FIG. 2 schematically shows an embodiment of a network system used with the arrangement of moving parts of FIG. 1 that has a node that is identified by an embodiment of an identification method in accordance with the present invention.

As shown in FIGS. 1 and 2, the master unit 120 is coupled to the measuring devices 118 via a serial data bus 122. In particular, the master unit 120 includes a microprocessor system 150 that receives the position signals from the measuring devices 118 and controls the actuators 110, 112, 114 and 116 and the positions of the associated movable parts. The microprocessor system 150 maintains a configuration file with node identification, serial numbers, axis label and other product specific information related to the encoders of the measuring devices 118. The signals that are received by and sent by the master unit 120 are controlled by a bus controller 124 and bus transceiver 126 whose structure and function are well known in the art. Similarly, the signals sent by the master unit 120 are received by interface units 123, 125, 127 and 129 of the various movable parts schematically represented by dashed lines in FIG. 2. Each interface unit is identical in structure and includes a microcontroller system 128 that is used to control its associated actuator. Each interface unit also includes a bus controller 130 and a bus transceiver 132 whose structure and function are well known in the art. The signals received and sent by the movable parts are controlled by the bus controller 130 and bus transceiver 132.

As shown in FIG. 1, the master unit 120 is coupled to a user interface 134 for enabling an operator to manually input set-up information in accordance with the present invention. For this purpose the user interface 134 includes a display 136 and a data input device 138, such as a mouse or a keyboard.

Figure 3:
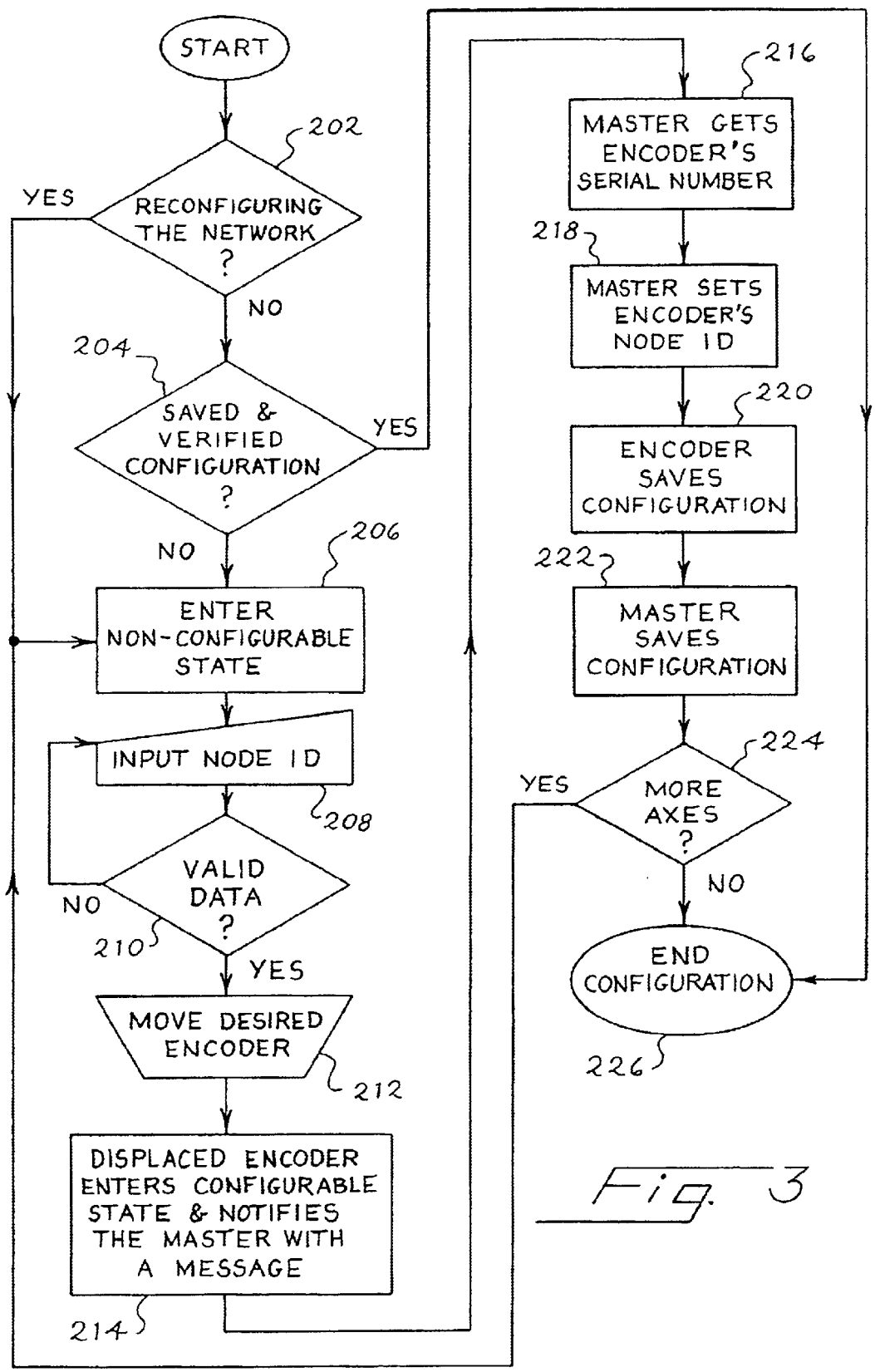
FIG. 3 shows a flow chart of an embodiment of an identification method to be used with the network system of FIGS. 1 and 2 in accordance with the present invention.

With the above structure of the arrangement 100 in mind, the programming of the moving parts and their associated interface units in accordance with the present invention will be described hereafter with respect to the flow chart of FIG. 3. In addition, in the example to be discussed hereafter, the node identification values are implemented via user interface 134 that is coupled to a network, such as a CANOpen network, with linear encoders. The network is composed of a number of nodes, wherein a node is a single device that can communicate independently on the network, such as a measuring device, I/O module or a motor. In this example, when the encoders of the measuring devices 118 leave the factory, they will be programmed with a default node identification that is not unique to the particular measuring device. Once a user turns the power on of the arrangement 100 via user interface 134, the master unit 120 queries the user via user interface 134 whether or not the network is to be reconfigured per step 202. If the network is to be reconfigured, it is reconfigured via user interface 134 per step 206. If the network is not to be reconfigured, the master unit 120 checks to see if the desired configuration is saved for the network per step 204 of FIG. 3. The saved configuration is a list of each encoder's node identification and serial number. If it is determined that there is a saved configuration, the master unit 120 then verifies the saved configuration by querying each saved node identification for its current serial number and comparing the response to the saved serial number for that node identification. This insures the integrity of the network and that a new node with an existing identification is not placed on the network. If the desired configuration is saved and valid, the master unit 120 implements the saved configuration and the configuration process is discontinued per step 226.

If there is no saved and/or valid configuration per step 204 or there is a need to change the configuration per step 202, then the master unit 120 will need to cause all nodes on the network to enter a non-configurable state per step 206 and configure each node/encoder and assign node identifications. This is accomplished by having the master unit 120 stop the network and place all nodes of the arrangement 100 into a non-configurable state by means such as the CANOpen Layer Setting Service, per step 206. At this stage the master unit 120, prompts the user via the user interface 134 to assign and enter a desired node identification for a particular axis of movement of the arrangement 100 per step 208. Alternately, the user may let the master unit 120 assign node identifications automatically.

After entering the desired node identification, the master unit 120 determines if the entered node identification is valid. If it is not, then the user interface 134 informs the user that the entered node identification is not valid and requests the user to enter a new node identification per step 210. The validity of a node identification is determined by being a unique integer value within a predetermined range, for example, a valid CANOpen node identification would be an integer value between 1 and 127, such as 29. At this point of the process where the entered node identification has been validated per step 210, the master unit 120 generates a message at user interface 134 that prompts the user, per step 212, to move the particular axis associated with the node by either a small distance in the case of a node corresponding to a linear encoder or a small angle in the case of a node corresponding to a rotary encoder. In response to the prompt of step 212, the user moves the particular axis of a moving part via the user interface 134 per step 214.

The encoder of the measuring device 118 connected to the particular axis associated with steps 212 and 214 recognizes that it has moved by comparing its present count value with its previous count value and determining that there is a difference between the two count values. Upon its recognition that it has moved at least a defined distance, the measuring device 118 associated with the particular axis changes into a configurable state, such as the LSS Configuration Mode. The selected encoder sends a message, such as a CANOpen Transmit Process Data Object (TPDO) message, to the master unit 120 so as to signify that the displaced encoder has changed into a configurable state, such as it has changed to the LSS Configuration Mode, per step 214. Upon receipt of the message, the master unit 120 determines that the encoder associated with steps 208 and 214 has been placed in a configurable state, such as the LSS Configuration Mode, wherein only one node may be at any particular time.

Besides determining that an encoder is in a configurable state, the master unit 120 performs a query of the serial number of the encoder. Upon receipt of the serial number per step 216, the master unit 120 sends a new node identification to the encoder, such as defined in the CANOpen LSS protocol per step 218. Upon receipt of its new node identification, the encoder saves the configuration per step 220 and sends a confirmation message to the master unit 120 indicating that the encoder has received the new node identification.

With the new node identification in place for the displaced encoder, the master unit 120 resets the microprocessor system and saves the configuration data of the displaced encoder per step 222, such as the new node identification, the axis label associated with the encoder and the serial number of the encoder. Thus, the above process is able to distinguish one node from other nodes of a network of encoders by displacing an encoder associated with the node to be distinguished After one node is distinguished, the master unit 120 determines if there are other axes or nodes that need to the distinguished in the network per step 224. If there are, then the process is repeated beginning at step 206. If there are no further axes or nodes to distinguish, then the process is completed per step 226. Note that if at the time power is turned off the configuration of the master unit 120 or the encoder saved, then the system will revert to the previously saved configuration for the master unit and encoder upon powering up the system.

The foregoing detailed description is merely illustrative of several physical embodiments of the invention. Physical variations of the invention, not fully described in the specification, may be encompassed within the preview of the claims. Accordingly, any narrower description of the elements in the specification should be used for general guidance, rather than to unduly restrict any broader descriptions of the elements in the following claims.

What is claimed is:

1. A method of identifying a node of an arrangement that includes a plurality of movable parts, said method comprising:

moving only one of a plurality of movable parts of an arrangement;

detecting said moving of said one of said plurality of movable parts;

distinguishing a node associated with said one of said plurality of movable parts based on said detecting;

stopping said arrangement prior to said moving;

placing all nodes of said arrangement into a configurable state after said stopping and prior to said moving; and naming a desired node identification for a particular axis of movement of said arrangement prior to said moving.

2. The method of claim 1, wherein said detecting is performed by a measuring device.

3. The method of claim 2, wherein said measuring device is programmed with a default node identification prior to said moving.

4. The method of claim 2, wherein said master unit saves configuration data of said measurement device which is associated with said identified node.

5. The method of claim 4, wherein said configuration data includes the serial number of said measurement device.

6. The method of claim 2, wherein said measurement device saves configuration data after being distinguished in a configurable state.

7. The method of claim 6, wherein said measurement device sends a confirmation message to said master unit indicating that the measurement device has received a new node identification.

8. The method of claim 1, wherein said arrangement is checked to insure its integrity prior to said moving.

9. The method of claim 1, further comprising having said measurement device enter said configurable state.

10. The method of claim 9, wherein only one node of said arrangement may be in said configurable state at any particular time.

* * * * *